United States Patent
Magnani

(10) Patent No.: US 10,173,482 B2
(45) Date of Patent: Jan. 8, 2019

(54) TYRE-CHANGING MACHINE FOR TRUCKS

(71) Applicant: M&B Engineering S.R.L., Correggio (IT)

(72) Inventor: Franco Magnani, Correggio (IT)

(73) Assignee: M&B Engineering S.R.L., Correggio (IT)

( * ) Notice: Subject to any disclaimer, the term of this patent is extended or adjusted under 35 U.S.C. 154(b) by 484 days.

(21) Appl. No.: 14/891,679

(22) PCT Filed: May 16, 2014

(86) PCT No.: PCT/IB2014/000744
§ 371 (c)(1),
(2) Date: Nov. 17, 2015

(87) PCT Pub. No.: WO2014/184645
PCT Pub. Date: Nov. 20, 2014

(65) Prior Publication Data
US 2016/0114637 A1     Apr. 28, 2016

(30) Foreign Application Priority Data

May 17, 2013 (IT) ............... PG2013A0021

(51) Int. Cl.
*B60C 25/05* (2006.01)
*B60C 25/138* (2006.01)
*G01M 1/04* (2006.01)

(52) U.S. Cl.
CPC ........ *B60C 25/0518* (2013.01); *B60C 25/053* (2013.01); *B60C 25/0506* (2013.01); *B60C 25/138* (2013.01); *G01M 1/045* (2013.01)

(58) Field of Classification Search
CPC ............ B60C 25/0518; B60C 25/0506; B60C 25/053; B60C 25/138; B60C 25/01;
(Continued)

(56) References Cited

U.S. PATENT DOCUMENTS

| 2005/0205214 A1* | 9/2005 | Matteucci ............. B60C 25/138 157/1.1 |
| 2011/0042875 A1* | 2/2011 | Story ................. B60C 25/0545 269/57 |
| 2011/0290428 A1* | 12/2011 | Roussel ................. B60B 30/06 157/1.22 |

FOREIGN PATENT DOCUMENTS

| EP | 1584496 | 10/2005 |
| WO | WO 9003561 A1 * 4/1990 ............. G01M 1/02 |

(Continued)

OTHER PUBLICATIONS

International Search Report dated Aug. 27, 2014 From the European Patent Office Re. Application No. PCT/IB2014/000744.

*Primary Examiner* — Robert J Scruggs

(57) ABSTRACT

The tire-changing machine (1) for trucks comprises a bearing frame (2), at least a work unit (3) associated with the frame (2), having at least a supporting element (4) for supporting a wheel which can be operated in rotation around a substantially horizontal first axis (5) and also having a balancing device (10) of the wheel, at least a tool (8) associated with the frame (2) for the removal of the wheel tire, at least one of the supporting element (4) and the tool (8) being mobile with respect to the other in the direction of reciprocal close/away movement and wherein the work unit (3) is connected mobile in rotation to the frame (2) around a second axis (12) of rotation, the supporting element (4) and the balancing device (10) rotating integrally to one another around the second axis (12).

7 Claims, 7 Drawing Sheets

(58) Field of Classification Search
CPC ..... B60C 25/05; B60C 25/132; B60C 25/135; B60C 25/04; B60C 25/02; B60C 25/025; G01M 1/045; G01M 1/04; G01M 1/02
USPC ........................................ 157/1.22, 1.1, 1.17
See application file for complete search history.

(56) References Cited

FOREIGN PATENT DOCUMENTS

| | | |
|---|---|---|
| WO | WO 2009/015920 | 2/2009 |
| WO | WO 2014/184645 | 11/2014 |

* cited by examiner

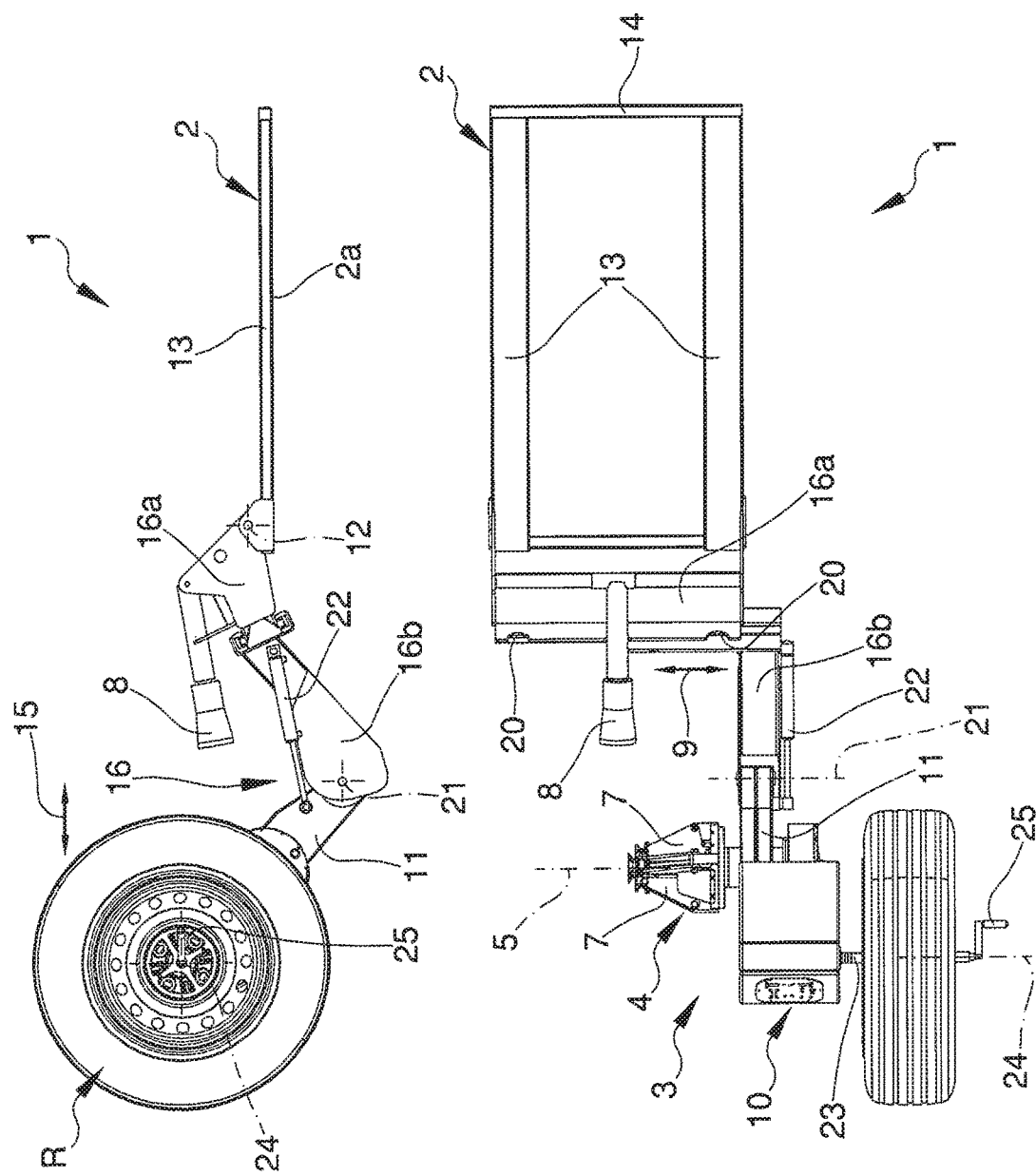

TYRE-CHANGING MACHINE FOR TRUCKS

RELATED APPLICATIONS

This application is a National Phase of PCT Patent Application No. PCT/IB2014/000744 having International filing date of May 16, 2014, which claims the benefit of priority of Italian Patent Application No. PG2013A000021 filed on May 17, 2013. The contents of the above applications are all incorporated by reference as if fully set forth herein in their entirety.

TECHNICAL FIELD

The present invention relates to a tyre-changing machine for trucks.

BACKGROUND ART

As is known, tyre-changing machines are generally used to remove a tyre from its rim.

More in particular, the tyre-changing machines known to date generally consist of a bearing frame with which is associated an element for supporting a wheel and a tool meant to cooperate with the relative tyre for the removal of same. The wheel supporting element can be operated in rotation around a relative axis so as to allow the complete removal of the tyre from its rim.

In the particular case of tyre-changing machines for trucks, in view of the complicated movement of the relative wheels due to their heavy weight, the supporting element is arranged so as to define a horizontal rotation axis, so as to ensure the easier positioning and removal of the wheel with respect to the case wherein the supporting element defines a vertical rotation axis (as generally occurs in the case of tyre-changing machines for motor vehicles).

Once the removal of the tyre has been terminated, the repaired or replaced wheel must be positioned on a relative balancing machine, separate from the above-mentioned tyre-changing machine, which is suitable for quantifying the offsetting weights to be fitted on the relative rim and identifying the fitting points of same.

These tyre-changing machines of known type have a number of drawbacks. More in particular, they do not allow both removing a tyre and balancing a wheel. With the equipment currently available in fact, to perform these operations, both a tyre-changing machine and a wheel balancing machine are required.

As is easy for the technician in the sector to appreciate, this first of all means spending a considerable amount of money, as it requires purchasing two separate machines, as well as being more difficult for the operator in terms of equipment management.

Furthermore, because the tyre-changing machines for trucks are also frequently used in the case of mobile service, i.e., they are mounted inside equipped vans to provide road breakdown service, it is evident that in this case it is not possible at all to perform the balancing of the wheel to be fitted to the truck.

US 2011/042875, WO 2009/015920 and EP 1584496 describe tyre-changing machines for trucks of known type.

DESCRIPTION OF THE INVENTION

The main aim of the present invention is to provide a tyre-changing machine for trucks which allows to perform both tyre removal and wheel balancing operations.

Within this aim, one object of the present invention is to make a tyre-changing machine which has a compact structure, so it can also be easily used for mobile service.

Another object of the present invention is therefore to reduce the investment needed to perform the removal and balancing operations and, at the same time, simplify the bearing out of such operations by the appointed operator.

Another object of the present invention is to provide a tyre-changing machine for trucks which can overcome the above mentioned drawbacks of the prior art in the ambit of a simple, rational, easy and effective to use as well as low cost solution.

The above mentioned objects are achieved by the present tyre-changing machine for trucks according to claim 1.

BRIEF DESCRIPTION OF THE DRAWINGS

Specific embodiments of the invention and advantageous technical-functional characteristics related to these embodiments will be described below in this treatise, in agreement with what indicated in the claims and with the aid of the attached drawings, in which:

FIG. 7 is a top plan view of the machine of FIG. 5;

FIG. 8 is a side elevation view of the machine of FIG. 5.

EMBODIMENTS OF THE INVENTION

Figure 1:
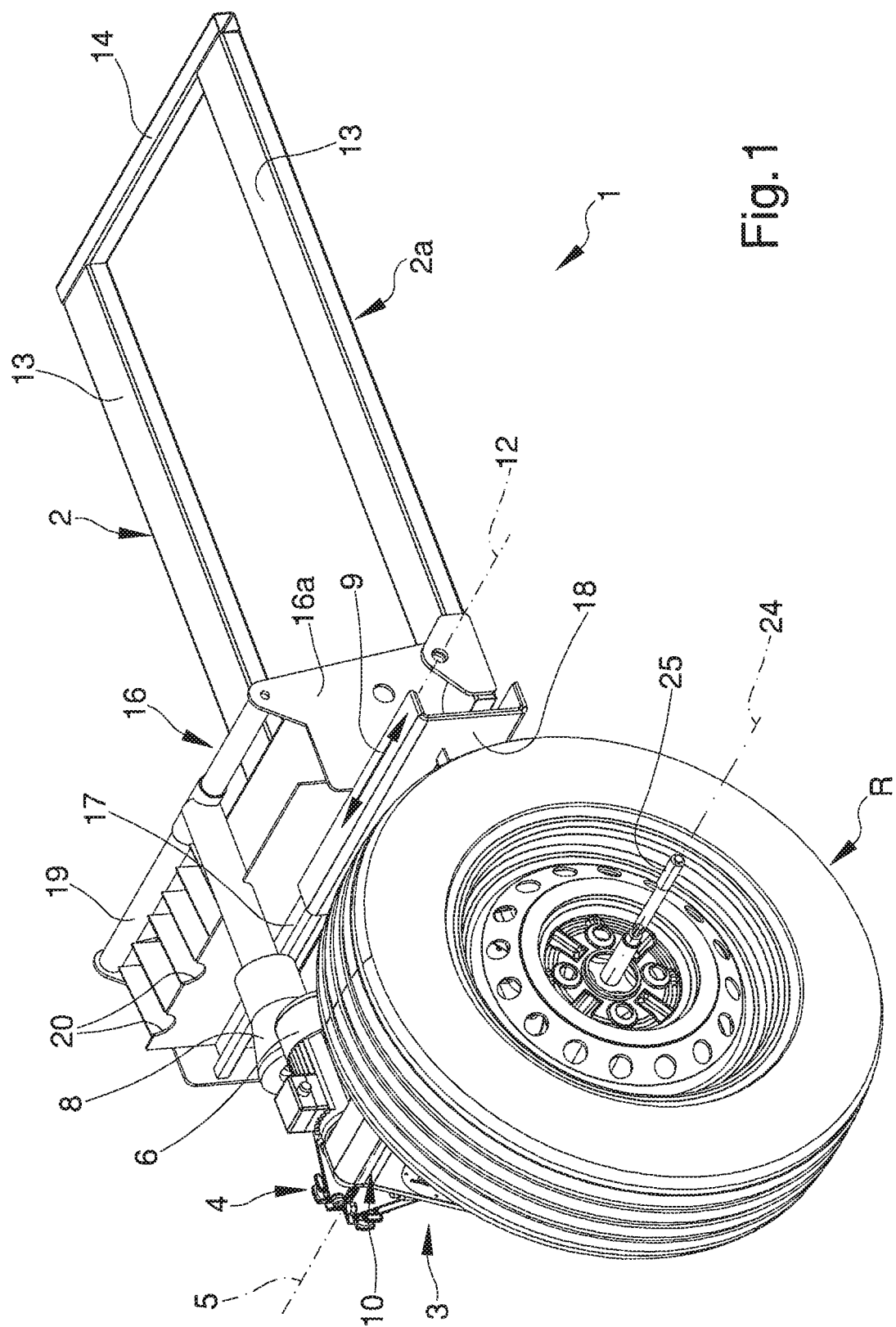
FIG. 1 is a first axonometric view of a tyre-changing machine according to the invention, in a first embodiment.
Figure 2:
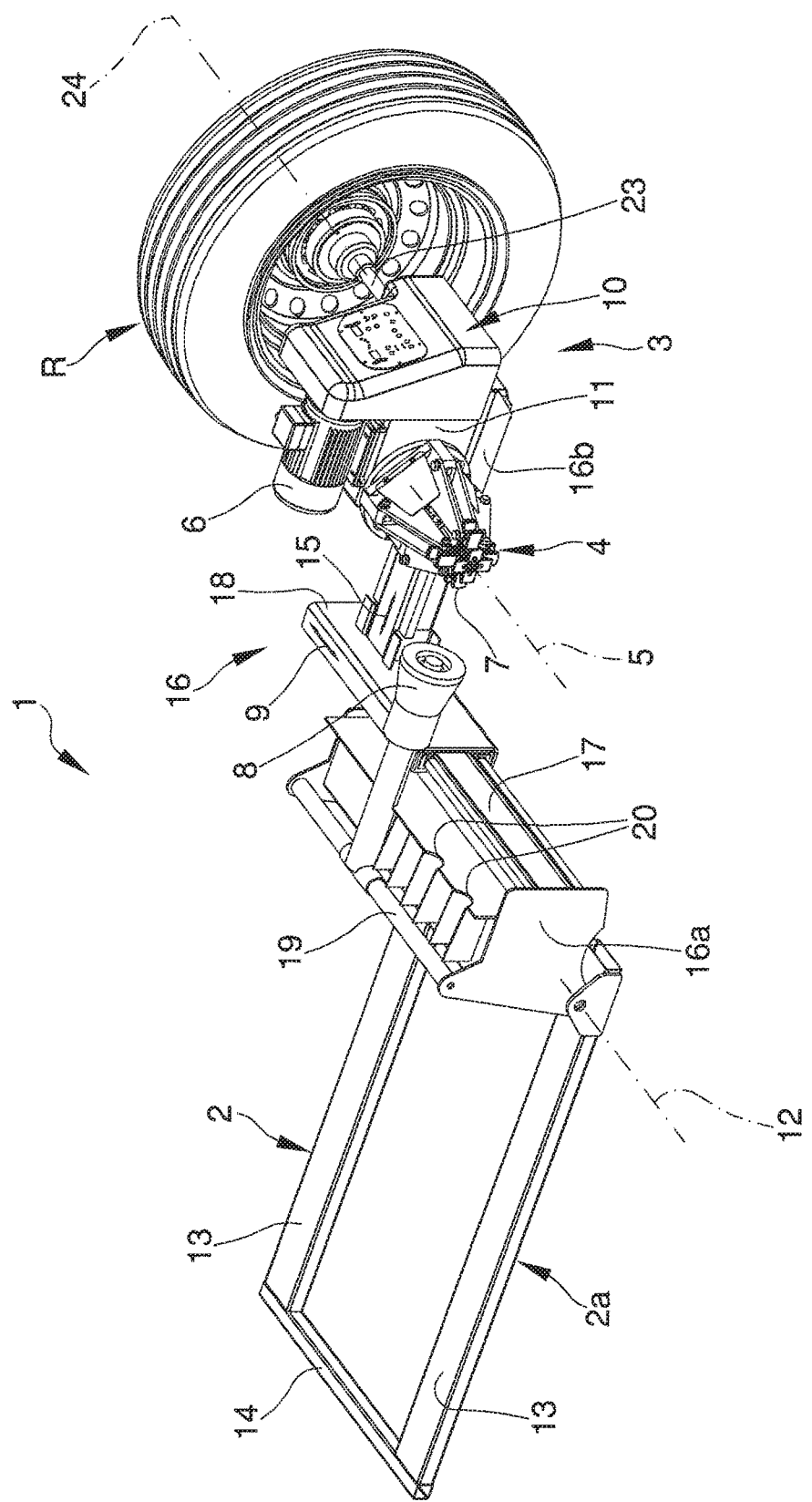
FIG. 2 is a second axonometric view of the machine of FIG. 1.
Figure 3:
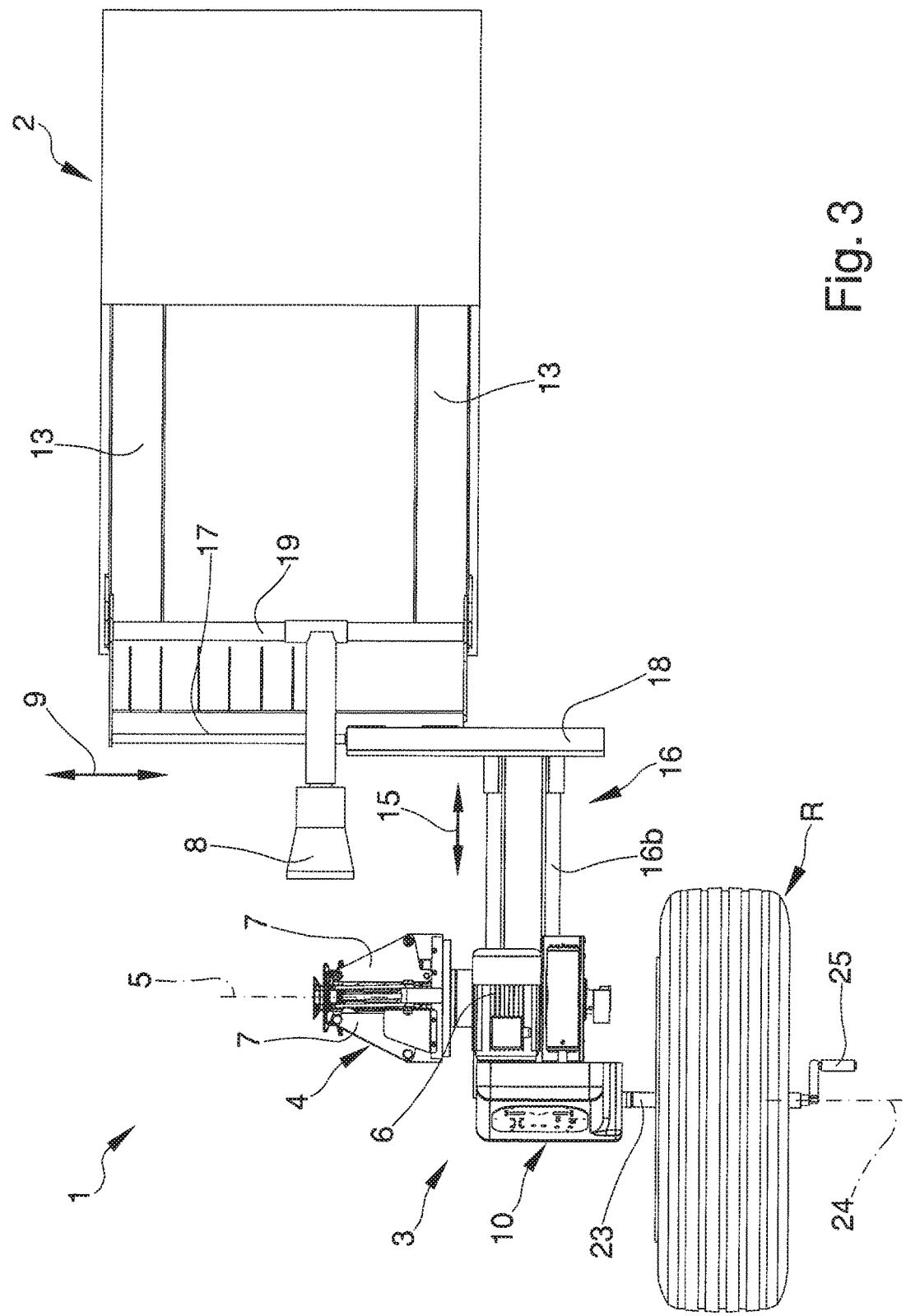
FIG. 3 is a top plan view of the machine of FIG. 1.
Figure 4:
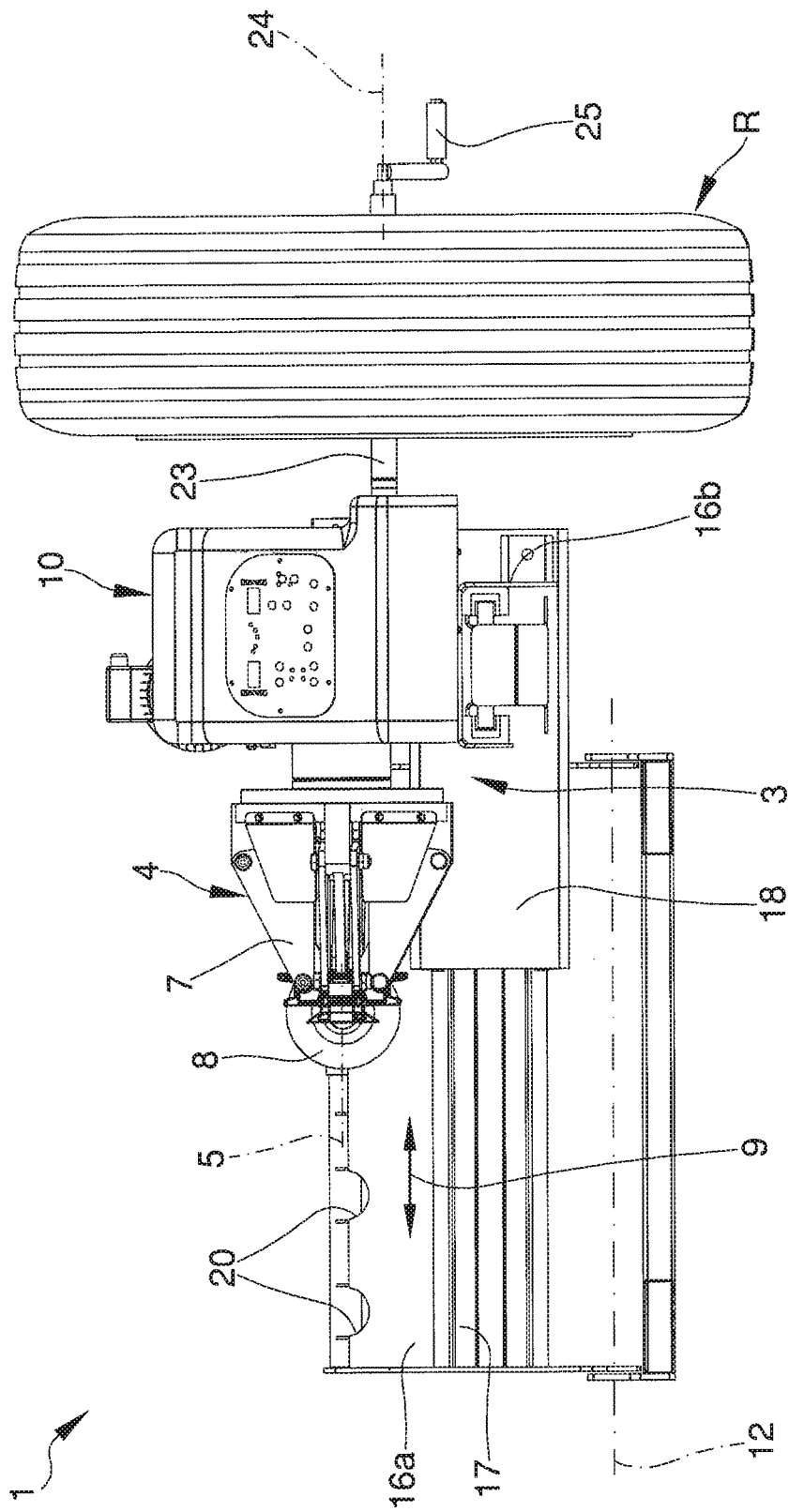
FIG. 4 is a front elevation view of the machine of FIG. 1.
Figure 5:
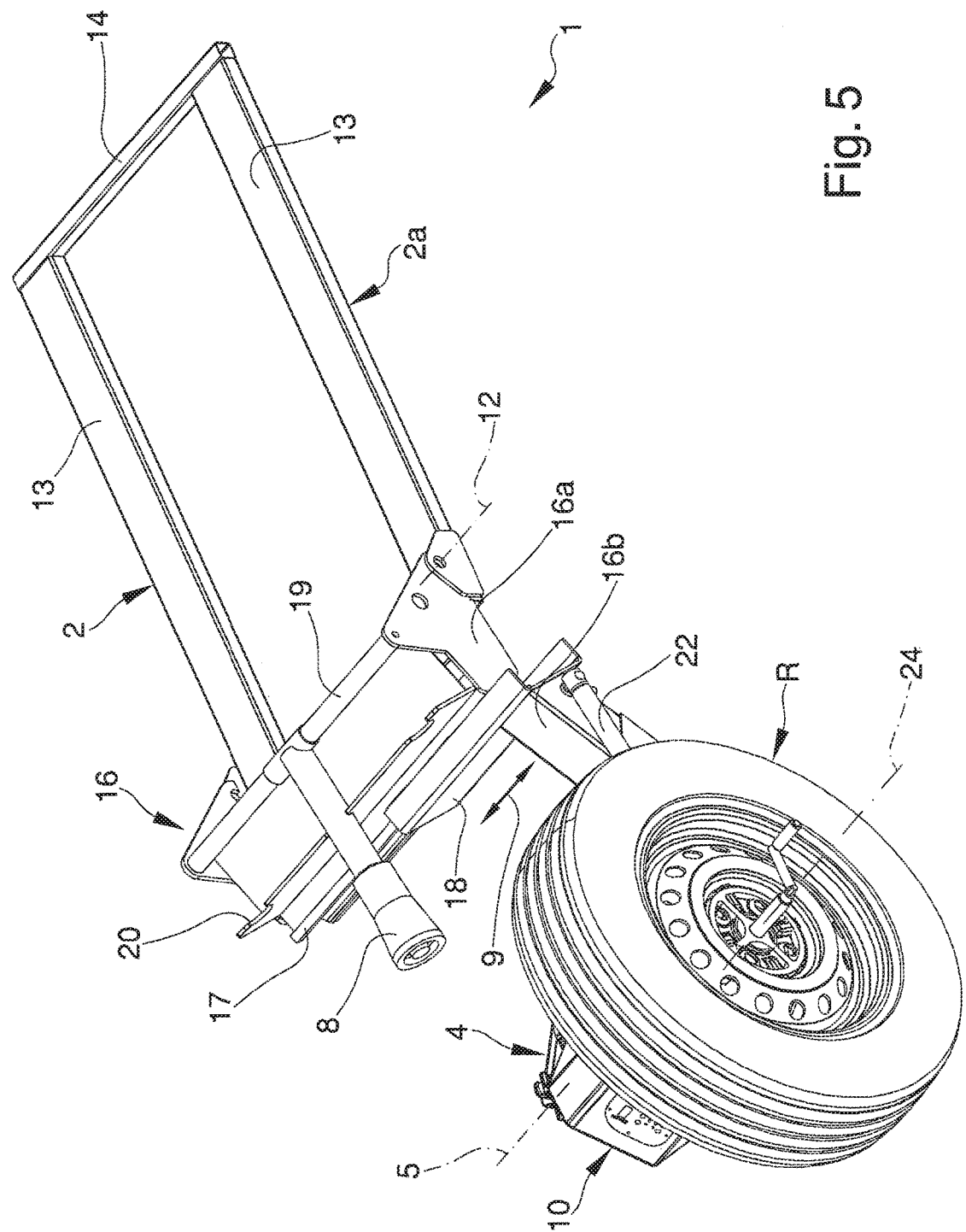
FIG. 5 is a first axonometric view of a tyre-changing machine according to the invention in a second embodiment.
Figure 6:
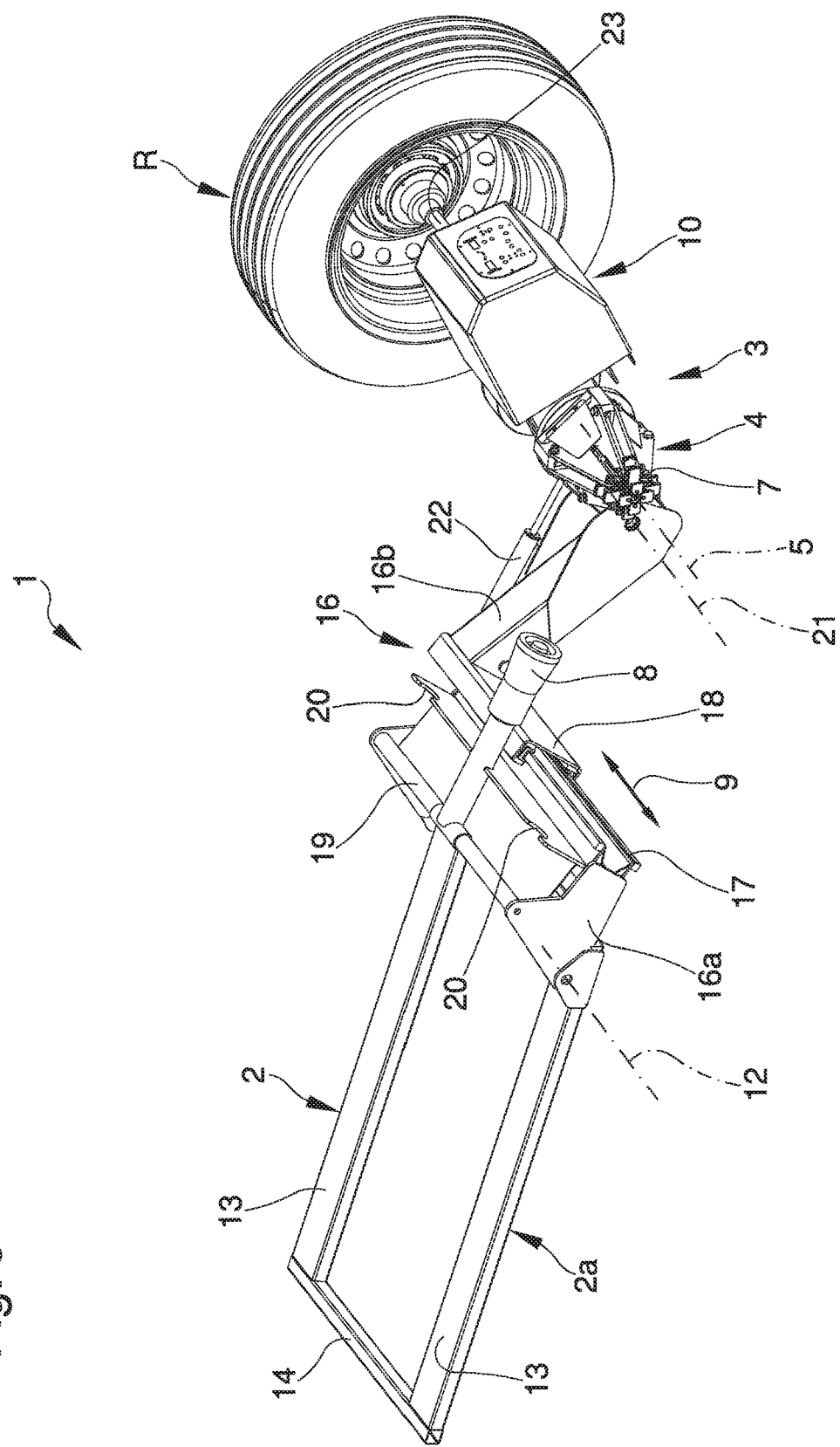
FIG. 6 is a second axonometric view of the machine of FIG. 5.

With particular reference to these illustrations, globally indicated by reference number 1 is a tyre-changing machine for trucks.

The machine 1 comprises a bearing frame 2 and at least a work unit 3 associated with the frame 2 and having at least a supporting element 4 for supporting a wheel which can be operated in rotation around a first axis 5 arranged substantially horizontally during use.

In the preferred embodiment shown in the illustrations, the machine 1 comprises motor means 6 which can be operated to start the rotation of the supporting element 4 around the first axis 5.

The supporting element 4 also has grip means 7 suitable for locking the wheel with respect to the supporting element itself. In the embodiment shown in the illustrations, the grip means 7 comprise a plurality of grippers which can be reciprocally moved close and away to/from each other to permit the release and the gripping of the wheel rim, respectively.

The machine 1 then comprises at least a tool 8, associated with the frame 2, for the removal of the tyre from its rim.

The tool 8, also called bead breaker, and the supporting element 4 are mobile in a direction of reciprocal close/away movement, i.e., at least one of them is mobile with respect to the other in a direction of close/away movement, to permit both the adaption to different wheel measurements and to remove the relative tyre. In fact, as the technician in the sector knows, once the wheel has been positioned on the supporting element 4 and locked by means of the grip means 7, the removal operation requires the tool 8 to be inserted between the tyre and the rim, reciprocally moving the supporting element 4 and the tool 8 and, subsequently, that the supporting element 4 be made to rotate around the first axis 5. More in particular, by inserting the tool 8 between the tyre and the rim, if necessary using an auxiliary lever, a portion of the tyre itself is made to come off, so that the subsequent rotation of the wheel by means of the movement of the supporting element 4 causes its complete removal.

In the embodiment shown in the illustrations, the supporting element 4 is connected mobile in translation to the frame 2 along at least a first direction identified by the reference number 9.

The tool 8 is also movable in translation with respect to the frame 2 along a direction substantially parallel to the first direction 9. More in particular, the tool 8 is movable between a plurality of predefined positions.

The work unit 3 also comprises a balancing device of a wheel identified in the illustrations by the reference number 10.

More in particular, the work unit 3 comprises at least a base element 11 integrally supporting the supporting element 4 and the balancing device 10.

The balancing device 10 comprises at least a shaft 23, which can be operated in rotation around a third axis 24 and meant to support the wheel R to be balanced. The shaft 23 is separate and independent from the supporting element 4.

In the embodiments shown in the illustrations, the third axis 24 is arranged substantially staggered and parallel to the first axis 5.

Parallel embodiments cannot however be ruled out wherein the third axis 24 is arranged transversal to the first axis 5.

Suitably, the machine 1 comprises movement means 25 for manually moving the shaft 23, e.g., consisting of a crank or the like.

Alternatively, the machine 1 can comprise motor means that can be operated to bring the shaft 23 to rotate around the third axis 24.

The balancing device 10 is of the type known to the technician in the sector and is therefore suitable for detecting the weight and area of application of the offsetting weights to be positioned on the rim of the wheel R to achieve the correct balance thereof.

More in detail, the balancing device 10 comprises means for identifying at least a balancing plane arranged substantially orthogonal to the axis of the wheel R to be balanced, and which identifies a balancing profile on the relative rim, measuring means for measuring the unbalance of the wheel R and a processing unit operatively connected to the identification means and to the measuring means to calculate the weight of the offsetting weights and the angular position of their fitting points on the rim. The identification means, the measuring means and the processing unit mentioned herein above are not visible in detail in the illustrations, which only show the external protection guard.

The balancing profile therefore corresponds to the intersection between the balancing plane and the rim and identifies all the points along which the balancing weights are to be positioned suitable for offsetting the unbalance of the wheel R.

The identification means can, e.g., be of the type of a mechanical feeler mobile with respect to the frame 2 both in translation and in rotation. In this case, the balancing profile therefore corresponds to the circumference arising from the intersection of the balancing plane arranged orthogonally to the axis of the wheel to be balanced and passing through the point of contact between the feeler and the rim with the rim itself.

Alternative embodiments cannot however be ruled out wherein the identification means comprise means for scanning the rim profile, also called pickup means.

The above-mentioned processing unit is suitable for detecting the position of the balancing plane, and therefore of the relative profile, with respect to a predefined reference system fixed with respect to the machine. The processing unit identifies e.g. the balancing profile corresponding to the contact point of the feeler with the inner surface of the rim.

The means for measuring the unbalance of the wheel R comprise force transducer means suitable for measuring the unbalance of the wheel to be balanced when this is made to rotate around the shaft 23.

The measuring means are also operatively connected to the processing unit, which also comprises means for calculating the weight of the offsetting weights to be fitted along the balancing profile and their angular position along the profile itself. The calculation means thus identify at least one fitting point of the offsetting weights along the balancing profile. The processing unit is therefore suitable for processing the information received from the identification means and from the measuring means, and for calculating the weight and the correct angular position of the offsetting weights along the balancing profile. The fitting points of the offsetting weights can also be more than one and, in a particular embodiment, their position can be pre-set by the operator, a special software splitting up the weight of the offsetting weights to be fitted at each set point.

The processing unit therefore also detects the angular position of the fitting point with respect to the fixed reference system, the position of the relative balancing plane being already known.

According to the invention, the work unit 3 is connected mobile in rotation to the frame 2 around a second axis 12 of rotation. This embodiment, wherein the supporting element 4 and the balancing device 10 rotate integrally to one another around the second axis 12, is particularly suitable for use of the machine 1 on mobile motor vehicles such as vans and the like, used for road breakdown service.

Preferably, such second axis 12 is arranged substantially horizontal.

In this respect, it must be noted that the frame 2 defines a supporting plane 2a suitable for allowing its positioning on the platform of a work motor vehicle. In the preferred embodiments shown in the illustrations, the frame 2 has an elongated shape, e.g., made up of two longitudinal members 13 joined together by means of a connection element 14. The rotation of the work unit 3 around the second axis 12 permits the movement of same between an idle position, wherein the work unit 3 is arranged inside the van, and an active position, wherein the work unit 3 is rotated with respect to the idle position and exits from the encumbrance of the van thereby positioning itself on the outside.

Suitably, the work unit 3 is connected in a kinematic way to the frame 2 and is mobile with respect to same along at least the first direction 9. It therefore follows that the supporting element 4 and the balancing device 10 move integral along the first direction 9.

Advantageously, the work unit 3 is connected in a kinematic way to the frame 2 and is mobile with respect to same along at least a second direction 15 transversal to the first direction 9, in close/away movement to/from the frame 2. It therefore follows that the supporting element 4 and the balancing device 10 also move integral along the second direction 15.

More in particular, the second direction 15 is substantially orthogonal to the first direction 9.

In the preferred embodiment shown in the illustrations, the machine 1 comprises a bearing structure 16 of the work unit 3, which has at least a first portion 16a connected in a kinematic way to the frame 2 and at least a second portion 16b connected in a kinematic way to the first portion 16a. The work unit 3 is in turn connected in a kinematic way to the second portion 16b.

More in particular, the first portion 16a is hinged to the frame 2 and the second portion 16b is associated in translation with the first portion 16a along the first direction 9.

In the first embodiment shown in the figures from 1 to 4, the first portion 16a defines at least a first guide element 17 which extends along the first direction 9 and the second portion 16b has a slide 18 associated with the first guide element itself.

The tool 8 can be fixed with respect to the first portion 16a or mobile in translation with respect to this. In this latter case, the first portion 16a has a second guide element 19 on which the tool 8 is fitted sliding. As shown in the illustrations, the second guide element extends parallel to the first direction 9. The first portion 16 also has locking elements 20, such as a plurality of seats, suitable for locking, during use, the position of the tool 8 with respect to the frame 2 and which define the predefined work positions of the tool itself.

In this first embodiment, the work unit 3 is associated sliding in translation along the second direction 15 to the second portion 16b. More in detail, the work unit 3 is associated with the second portion 16b by means of a slide type connection.

The shift of the second portion 16b along the first direction 9 and/or the shift of the work unit 3 along the second direction 15 can be done manually or, alternatively, using fluid dynamic actuator means.

In this embodiment, the work unit 3 therefore moves integral in rotation with the first portion 16a around the axis 12.

The second embodiment, shown in the illustrations from 5 to 9, differs from the above-described first embodiment inasmuch as the work unit 3 is associated in rotation with the second portion 16b around a relative axis identified in the illustrations by the number 21.

More in particular, the base element 11 is hinged to the second portion 16b and by effect of its rotation around the axis 21, the work unit 3 moves close to and away from the second portion 16b along the second direction 15.

Between the second portion 16b and the base element 11 is at least a fluid dynamic actuator 22 which can be operated to command its rotation around the axis 21.

It follows that the machine according to the invention permits achieving the proposed objects and in particular the fact is underlined that the machine forming the subject of the present invention permits performing both the removal operation of the tyre from the relative wheel and that of balancing.

The tyre-changing machine according to the invention thus permits considerably reducing, with respect to machines known to date, the economic investment required by a company or firm to provide tyre removal and wheel balancing services.

The tyre-changing machine according to the invention is also particularly suitable for being used in mobile breakdown services, i.e., for being positioned on work motor vehicles suitably equipped for road breakdown services. This is due to the presence of a bearing structure of the work unit which is hinged to the bearing frame, so as to allow the positioning of the work unit itself inside the van and its exit outside to perform the removal and balancing operations.

What has been described above is intended by way of example and is not limitative, so that any construction variations shall be deemed as falling within the protective scope of the present technical solution as claimed below.

What is claimed is:

1. A tyre-changing machine (1) for trucks, comprising:
   a bearing frame (2);
   at least a work unit (3) associated with said frame (2), having at least a supporting element (4) for supporting a wheel which can be operated in rotation around a substantially horizontal first axis (5) and also having a balancing device (10) of the wheel;
   at least a tool (8) associated with said frame (2) for the removal of the wheel tyre, at least one of said supporting element (4) and said tool (8) being mobile with respect to the other in the direction of reciprocal close/away movement;
   wherein said work unit (3) is connected mobile in rotation to said frame (2) around a second axis (12) of rotation, said supporting element (4) and said balancing device (10) rotating integrally to one another around said second axis (12),
   wherein said work unit (3) is connected mobile in translation to said frame (2) along at least a first direction (9) which is along an edge of said bearing frame (2), said supporting element (4) and said balancing device (10) moving integrally to one another along said first direction (9),
   wherein said work unit (3) is connected mobile to said frame (2) along at least a second direction (15) transversal to said first direction (9), said supporting element (4) and said balancing device (10) moving integrally to one another along said second direction (15),
   and wherein said balancing device (10) comprises at least a shaft (23), meant to support the wheel to be balanced, mobile in rotation around a substantially horizontal third axis (24) which is different from said first axis (5), said shaft (23) being separate and independent from said supporting element (4).

2. The machine (1) according to claim 1, wherein said work unit (3) comprises at least a base element (11) integrally supporting said supporting element (4) and said balancing device (10).

3. The machine (1) according to claim 1, wherein said second axis (12) of rotation is substantially horizontal.

4. The machine (1) according to claim 1, wherein it comprises a bearing structure (16) placed between said frame (2) and said work unit (3) which has a first and a second portion (16a, 16b) associated in a kinematic way with said frame (2) and with the first portion itself respectively, and in that said work unit (3) is connected in a kinematic way to said second portion (16b).

5. The machine (1) according to claim 4, wherein said first portion (16a) is associated mobile in rotation with said frame (2) around said second axis (12), that said second portion (16b) is associated mobile in translation with said first portion (16a) along said first direction (9) and that said work unit (3) is associated mobile with said second portion (16b) along said second direction (15).

6. The machine (1) according to claim 1, wherein said third axis (24) is arranged substantially parallel and staggered with respect to said first axis (5).

7. The machine (1) according to claim 1, wherein said third axis (24) is arranged transversal to said first axis (5).

\* \* \* \* \*